United States Patent
Robinson et al.

(10) Patent No.: US 8,455,569 B2
(45) Date of Patent: Jun. 4, 2013

(54) TWO-PART LIGHTWEIGHT AND LOW HEAVY METAL CONTENT EPOXY NON-SKID COATING FOR A DECK OR FLOOR

(75) Inventors: David Robinson, Washington, NJ (US); Ranell Santa Cruz, Saylorsburg, PA (US)

(73) Assignee: Illinois Tool Works Inc., Glenview, IL (US)

( * ) Notice: Subject to any disclaimer, the term of this patent is extended or adjusted under 35 U.S.C. 154(b) by 861 days.

(21) Appl. No.: 11/968,764

(22) Filed: Jan. 3, 2008

(65) Prior Publication Data

US 2008/0167401 A1 Jul. 10, 2008

Related U.S. Application Data

(60) Provisional application No. 60/883,535, filed on Jan. 5, 2007.

(51) Int. Cl.
*C08J 5/14* (2006.01)

(52) U.S. Cl.
USPC ........... 523/150; 523/435; 427/214; 427/257; 427/410

(58) Field of Classification Search
USPC ....................................... 523/150
See application file for complete search history.

(56) References Cited

U.S. PATENT DOCUMENTS

| | | | |
|---|---|---|---|
| 5,110,657 A | 5/1992 | Ainslie | |
| 5,686,507 A * | 11/1997 | Hermele et al. | 523/153 |
| 5,795,925 A | 8/1998 | Heywood | |
| 5,849,052 A * | 12/1998 | Barber, Jr. | 51/298 |
| 6,004,539 A * | 12/1999 | Longo et al. | 424/49 |
| 6,632,860 B1 * | 10/2003 | Hansen et al. | 523/435 |
| 7,037,958 B1 | 5/2006 | Hansen et al. | |
| 2002/0064645 A1 | 5/2002 | Mukaida | |

FOREIGN PATENT DOCUMENTS

| | | |
|---|---|---|
| EP | 1000957 A1 | 5/2000 |
| JP | 62-125105 | 6/1987 |
| JP | 01-092262 A | 4/1989 |
| JP | 08-259717 A | 10/1996 |
| JP | 2000178502 A | 6/2000 |
| JP | 2002173668 A | 6/2002 |
| JP | 2005-330431 | 12/2005 |
| JP | 2006-200240 | 8/2006 |

OTHER PUBLICATIONS

Performance Specification, MIL-PRF-24667B, Jun. 3, 2005.*
Material Safety Data Sheet, "MS-4100 G Lightweight Base Component", pp. 1-2, Jul. 2, 2003.
Material Safety Data Sheet, "MS-4100 Hardener Component", pp. 1-2, Jan. 24, 2002.
Material Safety Data Sheet, "EPOXO-5044 Black Walkway Non-Slip", pp. 1-2, Apr. 9, 2002.
Israeli Patent Application No. 199624; Office Communication; Sep. 27, 2012; 3 pages.
Japanese Patent Application No. 2009-544987; Office Communication; Nov. 27, 2012; 6 pages.

* cited by examiner

*Primary Examiner* — Doris Lee
(74) *Attorney, Agent, or Firm* — Whyte Hirschboeck Dudek S.C.

(57) ABSTRACT

An non-skid coating comprising a two-part epoxy and a filler comprising particles of a thermoset resin provides a durable, low-weight, low-abrasive coating for decks and floors, especially for aircraft carrier flight decks. The coating has the further advantage of having lower heavy metal content than current aluminum-based, non-skid coatings.

32 Claims, No Drawings

TWO-PART LIGHTWEIGHT AND LOW HEAVY METAL CONTENT EPOXY NON-SKID COATING FOR A DECK OR FLOOR

CROSS-REFERENCE TO RELATED APPLICATION

This application claims the benefit of U.S. Provisional Patent Application No. 60/883,535 entitled "Two-Part Epoxy Non-Skid Coating for a Deck or Floor" filed on Jan. 5, 2007, which is hereby incorporated by reference herein.

BACKGROUND OF THE INVENTION

This invention relates generally to non-skid coatings, and more specifically to lightweight, low abrasive and low heavy metal content non-skid coatings suitable for floors and decks.

Non-skid coatings for ship decks should be durable, environmentally friendly and light-weight while still having sufficient anti-slippage properties. For naval ships, particularly aircraft carriers, multiple non-skid coatings may be used. For example, an aircraft carrier may use an "L Composition" non-skid coatings in the landing areas of flight decks and a general non-skid "G Composition" for all other areas. The landing area deck coatings must have non-abrasive aggregate in order to avoid abrading the arresting cables. Typically, flight deck coatings comprise a two-part reactive resin (including, but not limited to, epoxy resins), fillers, additives, thixotropes, etc. with an aluminum granule/aggregate filler. However, the current coatings still are heavier than desired, contain high amounts of specific heavy metals and do not provide enhanced anti-slip properties.

BRIEF SUMMARY OF THE INVENTION

In one embodiment, the invention is a composition for non-skid coatings, the composition comprising a two-part reactive resin (including, but not limited to, epoxy resins), fillers, additives, thixotropes, etc. and an aggregate/granule filler comprising particles of a thermoset and/or thermoplastic resin. In other embodiments, the thermoset resin is a special type of polycarbonate resin. Generally, the inventive composition is characterized by having lower heavy metal content than a composition having a similar loading of a filler comprising aluminum based particles and in having a density that is about 15 to about 30 percent less than a composition having a similar loading of a filler comprising aluminum or aluminum oxide based particles.

DETAILED DESCRIPTION OF THE INVENTION

The epoxy resin (other thermoset two part reactive resins can also be used in whole or to modify the epoxy) used in the practice of this invention may vary and includes conventional, commercially available epoxy resins. Two or more epoxy resins may be employed in combination. In general, known epoxy resins that are currently used for navy ship deck applications can be used. As described in U.S. Pat. No. 7,037,958, incorporated herein by reference, such epoxy resins can be glycidated resins, cycloaliphhatic resins, epoxidized oils, and so forth. The glycidated resins are frequently the reaction product of a glycidyl ether, such as epichlorohydrin, and a bisphenol compound such as bisphenol A; $C_4$-$C_{·28}$ alkyl glycidyl ethers; $C_2$-$C_{·28}$ alkyl- and alkenyl-glycidyl esters; $C_1$-$C_{·28}$ alkyl-, mono- and poly-phenol glycidyl ethers; polyglycidyl ethers of pyrocatechol, resorcinol, hydroquinone, 4,4'-dihydroxydiphenyl methane (or bisphenol F or Novalac), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl suflone, and tris (4-hydroxyphynyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof. Representative non-limiting examples of epoxy resins useful in this invention include bis-4,4'-(1-methylethylidene) phenol diglycidyl ether and (chloromethyl) oxirane Bisphenol A diglycidyl ether. Commercially available epoxy resins that can be used in the practice of this invention include, but are not limited to, Araldite GY6010, DER 331, Epalloy 1500, Epalloy 1501, GZ7071PM75 and Epon 828. Generally any conventional epoxy resin or hydrogenated epoxy resin with an epoxide equivalent weight of between 100 and 750 eew.

The non-skid coating is made by incorporating aggregate material into the epoxy coating. The aggregates usable for this invention can comprise thermoset and/or thermoplastic polymer resins used alone, blended or in combination with other low abrasive aggregates. Such resins include, but are not limited to, polycarbonates, such as allyl diglycol carbonate, ABS, methylmethacrylate as well cured epoxies, polyurethanes, acrylics, polyesters, and the like. The aggregate material is ground, milled or crushed to the desired particle size for a particular end use. A particularly convenient source for the thermoset polycarbonate aggregate material is crushed lenses from used eyeglasses. Typical particles sizes are in the 150 micron to 1600 micron range and can incorporate any ratio or blend of these particles sizes to optimize application and coefficient of friction characteristics.

Additionally, the aggregate can comprise plant-based aggregates. Such plant-based aggregates can be, for example, ground up nut shells, including, but not limited to, walnuts, Korean pine nuts, coconuts, etc. The plant-based aggregates can comprise up to 100% plant-based material or may be combined with aggregates/granules made from silica-free geological materials. Preferably the geological minerals have a Moh's hardness value from about 3 to about 7. Suitable examples of geological minerals include, but are not limited to, nephaline syenite and amorphous glass silicates.

The polymer aggregate can be used as 100% of the aggregate or may be partially or totally replaced with plant-based aggregate. As such, the aggregate comprises between 0-100% polymer aggregate and 0-100% plant-based aggregate, with the percentage of the polymer aggregate and the plant based aggregate summing to 100%.

The aggregate can be mixed into either, the resin or hardener or both, of the two epoxy components prior to blending the components together to begin the epoxy cure.

Numerous benefits can be achieved by using the inventive non-skid coating in place of existing non-skid coatings. First, the coatings weigh 15 to 30% less, on an equal volume basis, than current G or L compositions using aluminum or aluminum oxides. Second, the inventive coatings contain significantly reduced levels of heavy metal contamination. This benefit is particularly important due to the ever more restrictive EPA guidelines when the non-skids are removed from the decks and disposed in landfills. These metals include, but are not limited to, the following examples of reduced total metals content over the prior art.

|  | Typical Alumiinum Containing Non-Skid Total Metals Content | Typical Polymer Containing Non-Skid Total Metals Content |
|---|---|---|
| Chromium VI | 0.0005% | 0.00013% |
| Antimony | 0.006% | 0.000047% |
| Arsenic | 0.0087% | 0.00024% |
| Beryllium | 0.00188% | 0.000021% |
| Cadmium | 0.00095% | ND % |
| Chromium and/or Chromium III | <0.005% | ND % |
| Cobalt | <0.001% | 0.00044% |
| Copper | 0.0182% | 0.0048% |
| Lead | 0.015% | 0.00006% |
| Molybdenum | 0.0033% | 0.000033% |
| Mercury | <0.0001% | <0.0001% |
| Nickel | 0.0365% | 0.00015% |
| Selenium | <0.001% | ND % |
| Silver | 0.01% | ND % |
| Thallium | <0.001% | ND % |
| Zinc | 0.0052% | 0.00026% |

Third, the anti-slip properties of the inventive coatings are better because the aggregate particles tend to be angular compared to the generally smooth or spherical particles of aluminum aggregates. Typical improvements in anti-slip coefficient of friction properties are measured using the guidelines of MIL-PRF-24667B for 50 cycles and 500 cycles of the arresting cable are:

|  | Typical Aluminum Non skid | | Typical Polymer Grit Non-Skid | |
|---|---|---|---|---|
|  | 50 Cycles | 500 cycles | 50 Cycles | 500 Cycles |
| DRY | 1.03 | 0.95 | 1.20 | 1.80 |
| WET | 0.96 | 0.92 | 1.20 | 1.50 |
| OILY | 0.93 | 0.86 | 1.10 | 1.20 |

The inventive coatings have been blind tested on carrier fight decks. These tests demonstrated that the inventive coatings have sufficient durability and anti-slip properties, while also being sufficiently nonabrasive to the arresting cables to comply with the requirements for such applications.

The inventive coatings can be used in any situation where non-skid decks and flooring are required and low-coating weight is desired. Examples include floors in wet environments such as decks and steps on water-going vessels including boats, barges and ships, aircraft carrier flight decks, etc.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A composition for non-skid, low abrasive coatings, the composition comprising a two-part epoxy and a low-abrasive aggregate filler comprising particles of a thermoset polymer resin, wherein the thermoset polymer resin is a polycarbonate resin obtained from crushed lenses from used eyeglasses with a particle size from 150 µm to 1600 µm.

2. The composition of claim 1, characterized by having lower heavy metal content than a composition having a similar loading of a filler comprising aluminum based particles.

3. The composition of claim 1, characterized in having a density that is about 15 to about 30 percent less than a composition having a similar loading of a filler comprising aluminum based particles.

4. The composition of claim 1, wherein the coating meets military specification MIL-PRF-24667B as a Type L coating.

5. The composition of claim 1, wherein the thermoset resin particles comprise 100% of the filler.

6. The composition of claim 1, wherein the coating is non-abrasive to an arresting cable in contact with said coating on an aircraft landing area.

7. The composition of claim 1, wherein the thermoset polymer resin is selected from the group consisting of polycarbonates, acrylonitrile butadiene styrene (ABS), methylmethacrylate cured epoxies, polyurethanes, acrylics and polyesters.

8. The composition of claim 1, wherein the polycarbonate resin is an allyl diglycol carbonate.

9. The composition of claim 1, as a Type L coating composition.

10. The composition of claim 1, wherein the filler further comprises at least one plant-based aggregate.

11. The composition of claim 10, wherein the plant-based aggregate comprises ground nut shells.

12. The composition of claim 10, wherein the plant based aggregate and the thermoset polymer resin particles together comprise 100% of the filler.

13. The composition of claim 10, wherein the aggregate filler comprises the plant-based aggregate and an aggregate of a silica-free geological mineral.

14. The composition of claim 13, wherein the silica-free geological mineral has a Moh's hardness value from about 3 to about 7.

15. The composition of claim 13, wherein the silica-free geological mineral comprises nephaline syenite.

16. A non-slip floor comprising:
a substantially horizontal flooring surface; and
a non-skid, low abrasive coating composition that at least partially covers the flooring surface, wherein the coating composition comprises a two-part epoxy and a low abrasive aggregate filler comprising particles of a thermoset polymer resin, wherein the thermoset polymer resin is a polycarbonate resin obtained from crushed lenses from used eyeglasses with a particle size from 150 µm to 1600 µm.

17. The floor of claim 16, wherein the coating composition is characterized by having lower heavy metal content than a composition having a similar loading of a filler comprising aluminum based particles.

18. The floor of claim 16, wherein the coating composition is characterized by having a density that is about 15 to about 30 percent less than a composition having a similar loading of a filler comprising aluminum based particles.

19. The non-slip floor of claim 16, wherein the non-skid coating meets military specification MIL-PRF-24667B as a Type L coating.

20. The non-slip floor of claim 16, wherein the thermoset resin particles comprise 100% of the filler.

21. The floor of claim 16, wherein the filler further comprises at least one plant-based aggregate.

22. The floor of claim 21, wherein the aggregate filler comprises the plant-based aggregate and an aggregate of a silica-free geological mineral.

23. The non-slip floor of claim 21, wherein the plant based aggregate and the thermoset polymer resin particles together comprise 100% of the filler.

24. A water-going vessel comprising:
   at least one substantially horizontal step or deck surface; and
   a non-skid, low abrasive coating composition at least partially covering the horizontal step or deck surface, wherein the coating composition comprises a two-part epoxy and a low abrasive aggregate filler comprising particles of a thermoset polymer resin, wherein the thermoset polymer resin is a polycarbonate resin obtained from crushed lenses from used eyeglasses with a particle size from 150 µm to 1600 µm.

25. The vessel of claim 24, characterized in that the coating composition has a density that is about 15 to about 30 percent less than a composition having a similar loading of a filler comprising aluminum based particles.

26. The vessel of claim 24, wherein the aggregate filler further comprises at least one plant-based aggregate.

27. The vessel of claim 26, wherein the aggregate filler comprises the plant-based aggregate and an aggregate of a silica-free geological mineral.

28. The vessel of claim 24, wherein the vessel is an aircraft carrier.

29. The vessel of claim 28, wherein the deck surface is a flight deck.

30. The vessel of claim 29, wherein the deck surface comprises the landing area of the flight deck and the coating composition is a Type L coating.

31. A non-skid, low abrasive coating composition, comprising a two-part epoxy and a low-abrasive aggregate filler comprising particles of a thermoset polymer resin, wherein the coating is non-abrasive to an arresting cable in contact with said coating on an aircraft landing area, wherein the thermoset polymer resin is a polycarbonate resin obtained from crushed lenses from used eyeglasses with a particle size from 150 µm to 1600 µm.

32. A composition for non-skid, low abrasive coatings, the composition comprising a two-part epoxy and a low-abrasive aggregate filler comprising particles of a thermoset polymer resin, wherein the coating meets military specification MIL-PRF-24667B as a Type L coating.

* * * * *